United States Patent
Hackenberg et al.

(10) Patent No.: US 12,261,330 B2
(45) Date of Patent: Mar. 25, 2025

(54) BIPOLAR PLATE FOR A FUEL CELL, FUEL CELL HAVING A BIPOLAR PLATE

(71) Applicant: Robert Bosch GmbH, Stuttgart (DE)

(72) Inventors: Juergen Hackenberg, Sachsenheim (DE); Martina Bubrin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 17/782,220

(22) PCT Filed: Nov. 23, 2020

(86) PCT No.: PCT/EP2020/083055
§ 371 (c)(1),
(2) Date: Jun. 3, 2022

(87) PCT Pub. No.: WO2021/110454
PCT Pub. Date: Jun. 10, 2021

(65) Prior Publication Data
US 2023/0024473 A1 Jan. 26, 2023

(30) Foreign Application Priority Data
Dec. 4, 2019 (DE) .................. 10 2019 218 859.1

(51) Int. Cl.
*H01M 8/0228* (2016.01)
*H01M 8/0208* (2016.01)

(52) U.S. Cl.
CPC ....... *H01M 8/0228* (2013.01); *H01M 8/0208* (2013.01)

(58) Field of Classification Search
CPC ............ H01M 8/0228; H01M 8/0208; H01M 8/0206; H01M 8/021; Y02E 60/50
See application file for complete search history.

(56) References Cited

U.S. PATENT DOCUMENTS

2006/0078776 A1* 4/2006 Elhamid ............... H01M 8/021
427/427
2018/0323461 A1* 11/2018 Suzuki ................ H01M 4/8807

FOREIGN PATENT DOCUMENTS

CN 1776946 A * 5/2006
CN 101095249 A 12/2007
(Continued)

OTHER PUBLICATIONS

Chanda et al., "Evaluation of Ni—Cr—P coatings electrodeposited on low carbon steel bipolar plates for polymer electrolyte membrane fuel cell", International Journal of Hydrogen Energy, 2018, vol. 43, No. 52, 23430-23440 (Year: 2018).*

(Continued)

*Primary Examiner* — Daniel S Gatewood
(74) *Attorney, Agent, or Firm* — Michael Best & Friedrich LLP

(57) ABSTRACT

The invention relates to a bipolar plate (1) for a fuel cell, comprising a bipolar plate substrate (2) composed of stainless steel and comprising a coating (3), which is applied to the bipolar plate substrate (2), for increasing the corrosion resistance of the bipolar plate (1). According to the invention, the coating (3) is of single- or multi-layer design and has at least one layer (4) composed of a metal matrix (5) with non-passivating dispersoid particles (6) incorporated therein. The invention further relates to a fuel cell having at least one bipolar plate (1) according to the invention.

19 Claims, 1 Drawing Sheet

(56) References Cited

FOREIGN PATENT DOCUMENTS

CN 106252684 A 12/2016
DE 112005002439 B4 9/2014

OTHER PUBLICATIONS

Translation of International Search Report for Application No. PCT/EP2020/083055 dated Feb. 10, 2021 (2 pages).
Jin et al., "The corrosion behavior and mechanical properties of CrN/Ni—P multilayer coated mild steel as bipolar plates for proton exchange membrane fuel cells", International Journal of Hydrogen Energy, 2017, vol. 42, No. 48, pp. 1-15.
Chanda et al., "Evaluation of Ni—Cr—P coatings electrodeposited on low carbon steel bipolar plates for polymer electrolyte membrane fuel cell", International Journal of Hydrogen Energy, 2018, vol. 43, No. 52, 11 pages.

* cited by examiner

BIPOLAR PLATE FOR A FUEL CELL, FUEL CELL HAVING A BIPOLAR PLATE

BACKGROUND OF THE INVENTION

The invention relates to a bipolar plate for a fuel cell, the bipolar plate comprising a stainless steel bipolar plate substrate and a coating applied on the bipolar plate substrate to increase the corrosion resistance of the bipolar plate. The invention further relates to a fuel cell having at least one bipolar plate.

Fuel cells are electrochemical energy transformers which can be used to convert hydrogen ($H_2$) and oxygen ($O_2$) into electrical energy, water ($H_2O$), and heat. For this a fuel cell comprises an anode, a cathode, and an electrolyte, which is disposed between the anode and the cathode. This cell core package along with further cell components is typically bordered by bipolar plates disposed on either side. The function of the bipolar plates is to regulate the supply of hydrogen and air, the removal of water vapor, and the output of thermal and electrical energy.

Electrical energy obtained using fuel cells can be utilized as propulsive energy, to propel a vehicle, for example. Successful commercialization of fuel cells for such applications is dependent in particular on the competitiveness of the fuel cell relative to other energy sources.

Bipolar plates make up a decisive fraction both of the production costs and of the weight of the fuel cell. For some time, accordingly, efforts have been made, in the form of research and development work, to increase the performance and the integrity of bipolar plates. Great potential in this context is ascribed to stainless steel as a base material for a bipolar plate, as stainless steel exhibits high thermal and electrical conductivity and also good mechanical properties. Furthermore, the material is comparatively favorably priced. Bipolar plates of stainless steel, moreover, can be manufactured rapidly and in large numbers by stamping or hydroforming processes. In the acidic media environment of the fuel cell, however, the stainless steel undergoes passivation, by formation of chromium oxide on the surface, and this leads to an unacceptable increase in the contact resistance.

In the prior art, therefore, bipolar plates with bipolar plate substrates made of stainless steel with a coating applied thereon have already been proposed. The majority of conventional coatings, however, are costly and tend toward local corrosion due to surface defects. The release of the corrosion products may lead to irreversible damage to the fuel cell.

DE 11 2005 002 439 B4, furthermore, discloses a coating for a stainless steel bipolar plate substrate, this coating comprising a corrosion-resistant first layer and applied thereon an outer layer to minimize the contact resistance. The material proposed for the first layer is likewise stainless steel, with the corrosion resistance of the stainless steel of the corrosion-resistant layer being greater than that of the stainless steel of which the bipolar plate substrate is made. Materials proposed for the outer layer are gold, platinum or its alloys, rhodium, ruthenium or its alloys, palladium or its alloys, or a polymer.

Starting from the prior art set out above, the problem addressed by the present invention is that of specifying a bipolar plate for a fuel cell that exhibits low contact resistance and high corrosion resistance over the intended lifetime and at the same time is inexpensive to manufacture.

SUMMARY OF THE INVENTION

For the solution to the problem, the bipolar plate having the features according to the invention and a method for producing a bipolar plate are specified. Advantageous embodiments are apparent from the respective dependent claims. Also proposed is a fuel cell having at least one bipolar plate of the invention.

The proposed bipolar plate comprises a stainless steel bipolar plate substrate and a coating applied on the bipolar plate substrate to increase the corrosion resistance of the bipolar plate. In accordance with the invention the coating has a single-layer or multilayer configuration and comprises at least one layer of a metallic matrix with nonpassivating dispersoid particles incorporated therein.

The proposed layer consisting of a metallic matrix with nonpassivating dispersoid particles incorporated therein unites two functions in one layer. The metallic matrix of the layer increases the corrosion resistance. At the same time the nonpassivating dispersoid particles incorporated therein minimize the contact resistance. The layer proposed therefore replaces a two-layer system ("duplex" layer system) consisting of a corrosion-resistant first layer and a contact resistance-minimizing second layer in accordance with the abovementioned prior art.

Since one layer is generally easier and less costly to manufacture than two layers, this proves to be a cost advantage. The one layer here takes on the functions of two layers, so there is no need to accept reductions in functionality.

This is not to rule out the presence of at least one further layer between the bipolar plate substrate and the metallic matrix with incorporated nonpassivating dispersoid particles. In accordance with the invention, indeed, the coating of the bipolar plate substrate may also have a multilayer configuration. At the same time it is possible to obtain a further cost saving with a multilayer system.

In order to prevent local surface defects, the coating of the bipolar plate substrate must have a certain total layer thickness. In the case of a single-layer system, this corresponds to the layer thickness of the metallic matrix with the nonpassivating dispersoid particles incorporated therein. In the case of a multilayer system, the layer thickness of the metallic matrix can be reduced, which is associated with reduced consumption of dispersoid particles. As these particles are comparatively expensive, costs can be saved with a multilayer system, more particularly a two-layer system.

Where the coating of the bipolar plate substrate has a multilayer configuration, more particularly a two-layer configuration, the layer consisting of a metallic matrix with nonpassivating dispersoid particles incorporated therein forms a concluding outer layer. In order to form a contact face, indeed, the dispersoid particles must lie partially exposed. In a multilayer system, the layer thickness of the outer layer can be adapted optimally to the particle size of the dispersoid particles, to create a maximum contact face area, as a larger area of the dispersoid particles is exposed at the surface. In this connection as well, therefore, a multilayer coating is advantageous. In combination with the outer layer, the at least one further layer of the multilayer coating ensures the requisite corrosion resistance of the bipolar plate substrate.

The metallic matrix of the one layer and/or of the outer layer consists preferably of silver, nickel (Ni) or a nickel alloy, the nickel alloy preferably comprising a phosphorus (P) and/or tungsten (W) and/or molybdenum (Mo). The alloy in this case is an NiP, NiW, NiPW, NiMo or NiMoP alloy. The proposed nickel alloys more particularly have a high corrosion resistance in the acidic environment of a fuel cell. Owing to the formation of a nickel oxide or tungsten oxide layer, however, they are not suitable for minimizing the contact resistance. This requirement is met by the incorporated nonpassivating dispersoid particles.

When an NiP alloy is used, the weight fraction of the phosphorus is preferably 3 to 12 wt %, based on the total weight of the starting materials. To achieve effective corrosion resistance there should in particular be phosphorus fractions of at least 6 wt %.

When an NiW alloy is used, the tungsten fractions are preferably 5 to 40 wt %, more preferably 15 to 35 wt %, based on the total weight of the starting materials.

To prevent passivation of the one layer and/or outer layer it is proposed that the metallic matrix comprise metal like carbides, examples being zirconium carbide (ZrC) and/or titanium carbide (TiC), and/or metal like nitrides, examples being titanium nitride (TiN) or tantalum nitride (TaN), as nonpassivating dispersoid particles. Alternatively or additionally the metal like matrix may also comprise graphite as dispersoid particles.

Preferably the dispersoid particles have a mean particle size of between 0.02 µm and 10 µm, more preferably between 0.05 µm and 0.8 µm. Factors governing the particle size include the layer thickness of the layer accommodating the dispersoid particles, or outer layer. The aim should be to create a relatively large exposed area on the surface as the contact face.

The volume fraction of the dispersoid particles in the one layer and/or outer layer is preferably between 5 and 40 vol %, more preferably between 10 and 30 vol %, based on the total volume of the layer or outer layer. The dispersoid particles here are present substantially in uniform distribution in the metallic matrix.

The layer thickness of the one layer and/or outer layer is preferably 1 to 10 µm, more preferably 1 to 5 µm, very preferably 1 to 3 µm. In the case of a single layer, the layer thickness selected is greater than in the case of an outer layer of a coating of multilayer configuration. The layer thickness of a single layer may be more particularly 5 to 10 µm, that of the outer layer 1 to 5 µm, more particularly 1 to 3 µm. The layer thickness is dependent in particular on the particle size and on the concentration of the dispersoid particles contained.

As already mentioned, the proposed coating of the bipolar plate substrate may have a multilayer configuration, more particularly a two-layer configuration. In this case there is at least one further layer disposed between the bipolar substrate and the layer or outer layer, this further layer being a corrosion-resistant layer. This layer—in combination with the above-described outer layer consisting of a metallic matrix with nonpassivating dispersoid particles incorporated therein—endows the bipolar plate with the requisite high corrosion resistance.

The configuration of the corrosion-resistant layer may be analogous to that of the metallic matrix of the outer layer. In contrast to the outer layer, however, this layer contains no dispersoid particles. This means that the corrosion resistant layer may consist more particularly of nickel or a nickel alloy, the nickel alloy preferably comprising phosphorus and/or tungsten. Alloys contemplated include accordingly, in particular, NiW, NiP, and NiWP alloys. For example, the corrosion-resistant layer may be formed of the same metallic matrix as the outer layer, with the corrosion-resistant layer therefore differing from the outer layer only in the absence of the dispersoid particles. The reason is that, relative to the corrosion-resistant layer, the outer layer has a further function, namely to minimize the contact resistance.

According to one preferred embodiment of the invention, a further layer is configured as an outer layer on the corrosion-resistant layer composed of a nickel alloy, this outer layer comprising a metallic matrix of silver and graphite as dispersoid particles. This combination of materials is seen as being particularly advantageous.

The layer thickness of the corrosion-resistant layer is preferably 1 to 7 µm, more preferably 2 to 5 µm. The layer thickness is to be selected such as to prevent surface defects. The layer thickness is therefore a tradeoff between lowest defect density and process time and/or costs.

The at least one layer of the proposed coating is formed preferably using an electrochemical process, such as an electrolytic process or a process free from external current. Electrolytic deposition in particular is suitable for large-surface-area application. In the case of a multilayer coating being performed, the electrical transfer resistance between the layers can be minimized by directly successive electrolytic coating processes, as metal-metal bonds are formed and at an atomic level.

Given that bipolar plates are employed in fuel cells, a proposal is additionally made for a fuel cell having at least one bipolar plate of the invention. The advantages of the bipolar plate of the invention result in a fuel cell with enhanced robustness and therefore lifetime, which, moreover, is easy and inexpensive to manufacture. Accordingly there is at the same time an increase in the competitiveness of the fuel cell in competition with other energy sources.

BRIEF DESCRIPTION OF THE DRAWINGS

The invention is elucidated in more detail below by means of the appended drawings. In these drawings.

DETAILED DESCRIPTION

Figure 1:
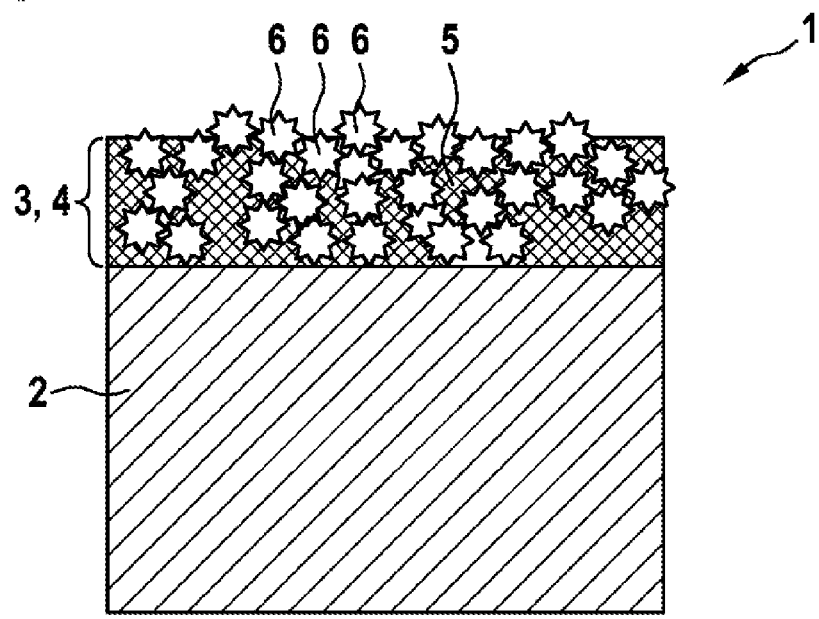
FIG. 1 shows a schematic longitudinal section through a bipolar plate of the invention according to a first preferred embodiment.

FIG. 1 indicates a first bipolar plate 1 of the invention for a fuel cell. The bipolar plate 1 represented comprises a bipolar plate substrate 2 and a coating 3 applied thereon. The coating 3 has a single-layer configuration, or is configured as one layer 4. The coating 3 or the layer 4 consists of a metallic matrix 5, in which nonpassivating dispersoid particles 6 are incorporated. As a result of the metallic matrix, the corrosion resistance of the bipolar plate 1 is high. The function of the incorporated dispersoid particles 6 is to minimize the contact resistance. The layer 4 therefore fulfils two functions, which are typically taken on by two separate layers.

The metallic matrix 5 presently consists of a nickel alloy, deposited on the bipolar plate substrate 2 in an electrolytic process. The dispersoid particles 6 are TiN particles. The concentration of the dispersoid particles 6 is selected such that a sufficient quantity of the particles come to lie on the surface of the layer 4 and form an exposed contact face.

Figure 2:
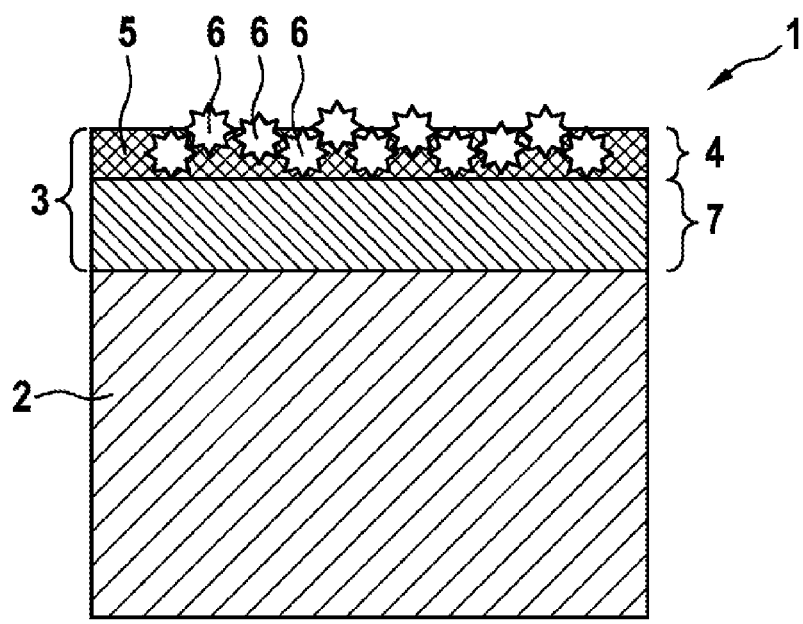
FIG. 2 shows a schematic longitudinal section through a bipolar plate of the invention according to a second preferred embodiment.

Since the dispersoid particles 6 represent a cost factor, a cost saving can be achieved by reducing the consumption of dispersoid particles 6. This may be accomplished, for example, by lowering the layer thickness of the layer 4 and forming a further layer 7 between the layer 4 and the bipolar plate substrate 2. The function of this further layer is additionally to ensure high corrosion resistance, as the reduced layer thickness of the layer 4 alone is no longer sufficient for this purpose. This exemplary embodiment of a bipolar plate 1 of the invention is represented illustratively in FIG. 2. FIG. 2 shows clearly that the fraction of the dispersoid particles 6 is reduced relative to the exemplary embodiment in FIG. 1. At the same time, the low layer thickness of the layer 4 ensures that the dispersoid particles 6 come to lie at the surface and are partially exposed, thus forming exposed contact faces. In a multilayer coating 3, accordingly, the layer 4 always forms the outer layer.

Irrespective of whether the coating 3 has a single-layer or multilayer configuration, the layer 4 always has two functions:
1. increasing the corrosion resistance, and
2. minimizing the contact resistance.

The first function is realized via the metallic matrix 5, and the second function via the dispersoid particles 6.

The invention claimed is:
1. A bipolar plate (1) for a fuel cell, the bipolar plate comprising a stainless steel bipolar plate substrate (2) and a coating (3) applied on the bipolar plate substrate (2) to increase a corrosion resistance of the bipolar plate (1),
wherein the coating (3) has a multilayer configuration and comprises at least one layer (4) of a metallic matrix (5) with nonpassivating dispersoid particles (6) incorporated therein, and a corrosion-resistant layer (7), wherein the corrosion-resistant layer (7) is disposed between the bipolar plate substrate (2) and the at least one layer (4), wherein the corrosion-resistant layer (7) has the same metallic matrix (5) as the at least one layer (4) and differs from the at least one layer (4) only in an absence of the dispersoid particles (6).
2. The bipolar plate (1) as claimed in claim 1,
wherein the metallic matrix (5) comprises silver, nickel or a nickel alloy.
3. The bipolar plate (1) as claimed in claim 1,
wherein the metallic matrix (5) comprises metallike carbides and/or nitrides and/or graphite as dispersoid particles (6).
4. The bipolar plate (1) as claimed in claim 1,
wherein the dispersoid particles (6) have a mean particle size of between 0.02 µm and 10 µm.
5. The bipolar plate (1) as claimed in claim 1,
wherein a volume fraction of the dispersoid particles (6) in the at least one layer (4) is between 5 and 40 vol % based on a total volume of the layer (4).
6. The bipolar plate (1) as claimed in claim 1,
wherein a layer thickness of the at least one layer (4) is 1 to 10 µm.
7. The bipolar plate (1) as claimed in claim 1,
wherein the corrosion-resistant layer (7) comprises nickel or a nickel alloy.
8. The bipolar plate (1) as claimed in claim 7,
wherein the at least one layer (4) is configured as an outer layer on the corrosion-resistant layer (7) and comprises a metallic matrix (5) of silver and graphite as dispersoid particles (6).
9. The bipolar plate (1) as claimed in claim 2,
wherein a layer thickness of the corrosion-resistant layer (7) is 1 to 7 µm.
10. A fuel cell having at least one bipolar plate (1) as claimed in claim 1.
11. The bipolar plate (1) as claimed in claim 1,
wherein the metallic matrix (5) comprises silver, nickel or a nickel alloy, the nickel alloy comprising phosphorus and/or tungsten and/or molybdenum.
12. The bipolar plate (1) as claimed in claim 11,
wherein the metallic matrix (5) comprises metallike carbides and/or nitrides and/or graphite as dispersoid particles (6).
13. The bipolar plate (1) as claimed in claim 12,
wherein the dispersoid particles (6) have a mean particle size of between 0.05 µm and 0.8 µm.
14. The bipolar plate (1) as claimed in claim 13,
wherein a volume fraction of the dispersoid particles (6) in the at least one layer (4) is between 10 and 30 vol %, based on a total volume of the at least one layer (4).
15. The bipolar plate (1) as claimed in claim 14,
wherein a layer thickness of the at least one layer (4) is 1 to 5 µm.
16. The bipolar plate (1) as claimed in claim 14,
wherein a layer thickness of the at least one layer (4) is 1 to 3 µm.
17. The bipolar plate (1) as claimed in claim 1,
wherein the corrosion-resistant layer (7) comprises nickel or a nickel alloy, the nickel alloy comprising phosphorus and/or tungsten.
18. The bipolar plate (1) as claimed in claim 17,
wherein the at least one layer (4) is configured as an outer layer on the corrosion-resistant layer (7) and comprises a metallic matrix (5) of silver and graphite as dispersoid particles (6).
19. The bipolar plate (1) as claimed in claim 11,
wherein a layer thickness of the corrosion-resistant layer (7) is 2 to 5 µm.

* * * * *